United States Patent [19]

Aldrich et al.

[11] 4,244,640

[45] Jan. 13, 1981

[54] FILM CASSETTE HAVING FRICTION PAD PULL STRIP STRESS RELIEVER

[75] Inventors: J. Winthrop Aldrich, Scituate; Joseph A. Stella, Peabody, both of Mass.

[73] Assignee: Polaroid Corporation, Cambridge, Mass.

[21] Appl. No.: 101,426

[22] Filed: Dec. 10, 1979

[51] Int. Cl.³ .......................................... G03C 11/00
[52] U.S. Cl. .............................. 352/130; 352/78 R; 354/85; 354/88
[58] Field of Search ................. 352/130, 78 R, 78 C; 354/83, 88

[56] References Cited

U.S. PATENT DOCUMENTS

| | | |
|---|---|---|
| 3,667,361 | 6/1972 | Meggs et al. |
| 3,895,862 | 7/1975 | Stella et al. ........................... 352/130 |
| 4,027,956 | 6/1977 | Stella et al. ........................... 352/130 |

*Primary Examiner*—Monroe H. Hayes

*Attorney, Agent, or Firm*—Frederick A. Goettel, Jr.

[57] ABSTRACT

An arrangement is provided for reducing the force imparted at the junction between the pull strip and the film strip in a multipurpose film cassette wherein the pull strip is employed to remove a tear tab closure initially sealing a supply of processing fluid. The pull strip is formed with a free end portion adapted to engage a tactile discontinuity in the film strip upon winding of the film strip upon a film spool. The pull strip is provided with a strip of high friction material which, upon continued advancement of the film strip, engages the surface of the outermost convolution of film strip advancing to the reel and which, upon such engagement with the film strip, cooperates with it to resist at least a portion of the force imparted through the pull strip during removal of the tear tab closure, thereby reducing the force imparted to the junction between the pull strip and the film strip.

6 Claims, 6 Drawing Figures

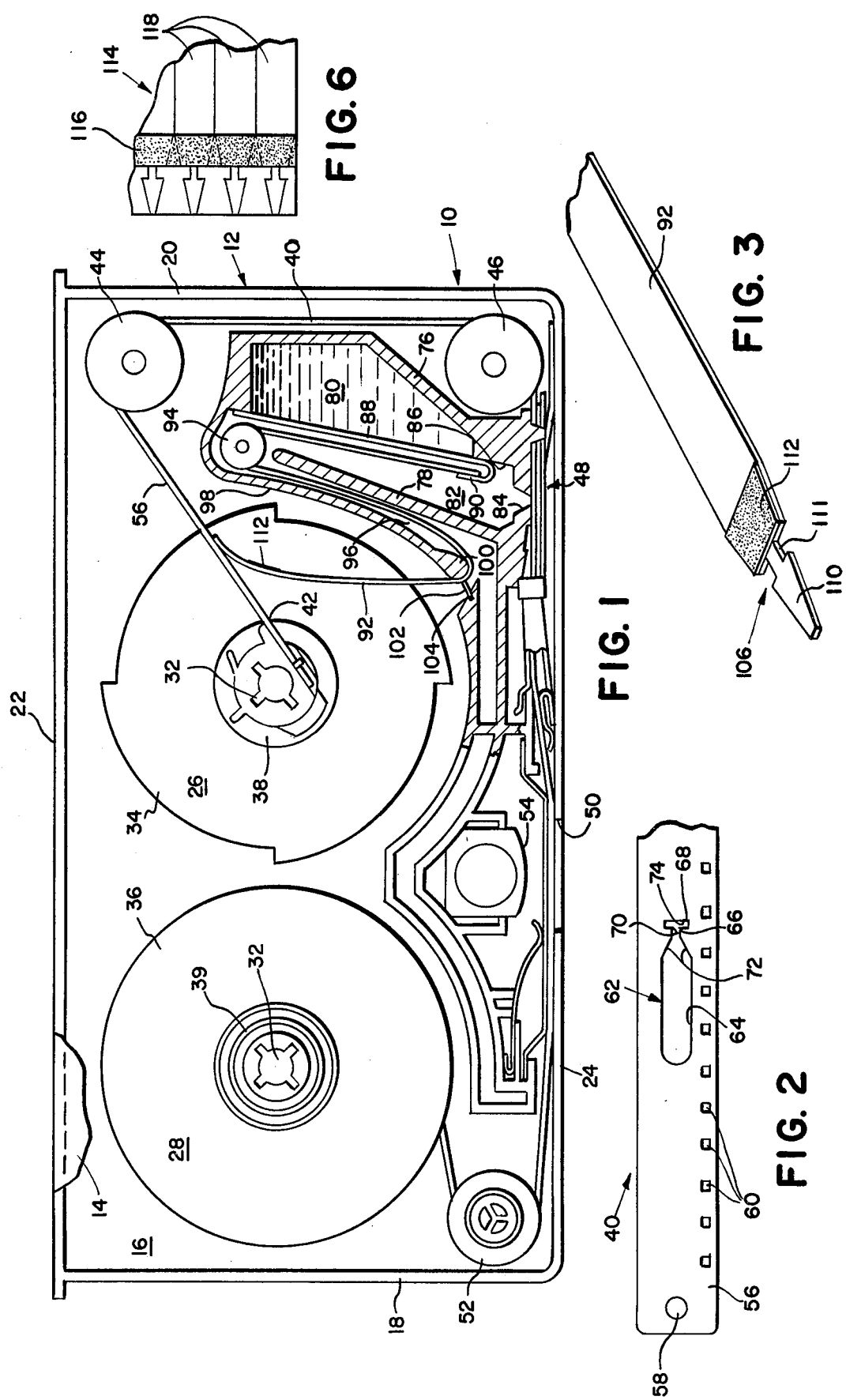

FILM CASSETTE HAVING FRICTION PAD PULL STRIP STRESS RELIEVER

BACKGROUND OF THE INVENTION

This invention relates to multipurpose photographic film cassettes and, more particularly, it concerns an improved arrangement for removing a removable tear tab closure for releasing processing fluid from an initially sealed reservoir forming part of a film processing organization of such a cassette.

Multipurpose, photographic film cassettes have been developed for use in motion picture photographic systems illustrated and described, for example, in U.S. Pat. No. 3,615,127 issued to Edwin H. Land on Oct. 26, 1971; U.S. Pat. No. 3,623,417 issued to Vaito K. Eloranta on Nov. 30, 1971; U.S. Pat. No. 3,785,725 issued to J. F. Batter, et al. on Jan. 15, 1974; and U.S. Pat. No. 3,895,862 issued to Joseph A. Stella, et al. on July 22, 1975, all of which are owned by the assignee of the present invention. In such systems, a strip of photographic film contained in a cassette can be exposed in a camera adapted to receive the cassette and then processed to provide viewable images by placing the cassette in a viewing aparatus equipped to activate a cassette-contained processor upon rewinding the exposed film strip. After processing in this manner, the viewing apparatus is operated as a projector to advance the film incrementally frame by frame past the light source so that the scene to which the film was exposed is reproduced in a manner well-known in the motion picture art.

In motion picture systems of the type described above, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid is contained in an initially closed reservoir or pod housed within the film cassette, the reservoir having a removable tear tab closure capable of being opened upon activation of the film processor by the viewing apparatus to allow the fluid to escape from the pod and pass through a nozzle-like opening against the exposed emulsion layer of the film strip. Although the processor is operated only once in any single cassette, which following processing provides a permanent housing for the processed film strip therein, its operation to achieve a uniform and complete layer of processing fluid over the exposed emulsion layer on the film strip is vital to satisfactory operation of the overall system.

To ensure retention of the processing fluid in the cassette-contained reservoir or pod up to the time it is needed for the processing operation and also in some measure to insure complete availability of the processing fluid upon initial activation of the processor, the processing fluid reservoir in such systems is provided with a relatively large opening covered initially by a releasably bonded tear tab closure capable of being completely pulled from the opening to release the processing fluid for distribution against the emulsion layer of the exposed film strip. In more advanced systems, similar to the type mentioned above, the release of processing fluid from the reservoir is brought about by a pull strip extension connected at one end to a folded-back portion of the reservoir sealing tear tab and having at its free end a configuration adapted to engage a tactile discontinuity, for example an aperture, formed in the leader end of the film strip attached to the supply spool during initial rewind rotation of the supply spool.

Such a pull strip, which may be mylar or other similar material, is initially supported and constrained to an essentially Z-shaped path in which the intermediate leg is established by a channel formed by internal cassette walls. At its exit from the channel, the extension is bent back on itself without exceeding the elastic limits of the material from which it is made so that the projecting free end lies yieldably against the outermost convolution of the film strip on the supply spool. As the film strip plays out from the supply spool during exposure, the free end of the pull strip will move inwardly due to the diminishing diameter of film strip convolutions on the supply spool until the film strip is completely exposed. At this time, an aperture in the leader end of the film strip connected to the supply spool will have passed the free end of the pull strip extension so that upon rewinding of the film strip back onto the supply spool, the free end of the pull strip will engage the film strip aperture and become entrained between successive convolutions of the film strip supply spool leader. Continued rewind rotation of the supply spool effects a pulling action on the pull strip and correspondingly, a peeling of the tear tab closure from the processing fluid reservoir to release the processing fluid for application thereof to the exposed film strip.

Such an arrangement for release of processing fluid from the reservoir is shown and described in U.S. Pat. No. 3,895,862 issued to Joseph A. Stella, et al. on July 22, 1975. As described in detail in this patent, the pull strip is provided with a tapered necked-down latching tongue configured to engage a bottle-shaped aperture in the film strip defined by an elongated engaging section and a locking section communicating with the engaging section through a necked-down portion. Following complete pay-out of the film strip from the supply reel and upon initial rewind movement of the film strip back onto the supply spool, the latching tongue engages the elongated section of the bottle-shaped aperture and upon further rewinding of the film strip, the latching tongue engages the film reel's hub and as the film strip continues to be rewound upon the reel, the pull strip is placed in tension as a resisting force of the tear tab is encountered by the advancing film strip/pull strip combination. The necked-down portion of the latching tongue passes through the necked-down portion of the bottle-shaped aperture in the film strip, and is pulled into positive engagement with the locking portion of the aperture in response to this resisting force.

Following such engagement, the necked-down portion of the pull strip, which has been bent over upon itself following such engagement, has, under some circumstances, been overstressed and broken as a result of the force imparted thereto by the resistance of the tear tab during its removal from the processing fluid reservoir.

SUMMARY OF THE INVENTION

In accordance with the present invention, a multipurpose film cassette of the type described hereinabove is provided with a strip of high friction material upon the surface of the portion of the pull strip immediately adjacent the end portion of the pull strip which passes through the bottle-shaped aperture. Such positioning of this strip of material results in its coming into engagement with a portion of the outermost convolution of the film strip as the film strip and the pull strip are advanced back onto the supply spool.

The coefficient of friction of the high friction material is greater than the coefficient of friction of the material from which the pull strip is fabricated and, as a result, the frictional engagement of the strip of material with the outermost convolution of the film strip upon passage of the film strip and the pull strip onto the reel will serve to resist at least a portion of the resisting force transmitted through the pull strip upon separation of the tear tab during actuation of the processor. As a result, the full force necessary to remove the tear tab is not transmitted to the free end of the pull strip which is locked in engagement with the film strip and, as a result, the possibility of overstress and failure of the pull strip where it is in locking engagement with the film strip is reduced.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a diagrammatic side elevational view of a film cassette according to the present invention with the front wall thereof cut away and other portions thereof in partial section to illustrate the internal working components;

FIG. 2 is a plan view of a supply leader end of a film strip utilized in the cassette shown in FIG. 1;

FIG. 3 is a perspective view illustrating the free end of the pull strip employed in the cassette of FIG. 1;

FIG. 6 is a plan view illustrating the manner of manufacturing the pull strip of the present invention.

DETAILED DESCRIPTION OF THE PREFERRED EMBODIMENT

Figure 4:
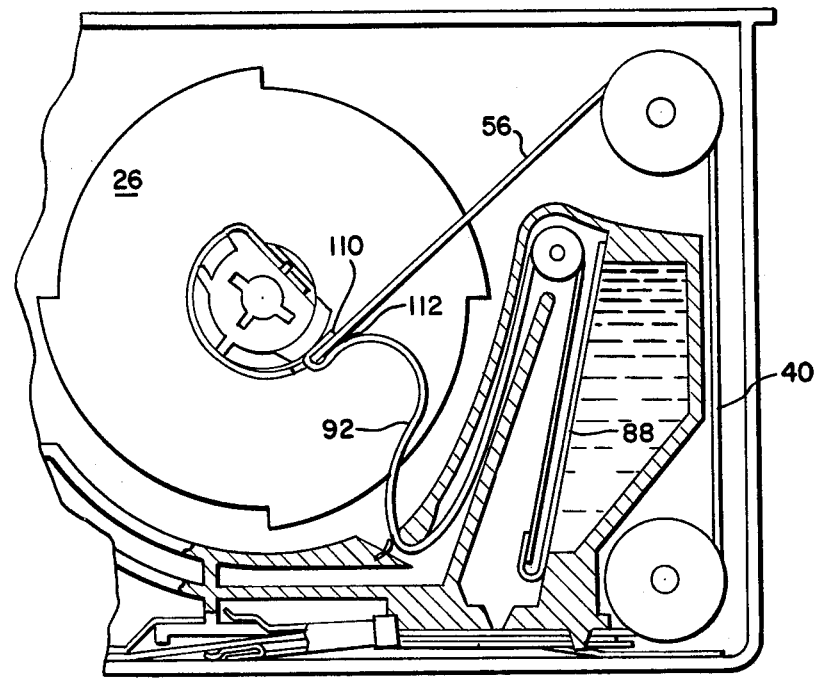
FIGS. 4 and 5 are cut-away fragmentary side elevations illustrating a cassette supply spool and tear tab closure/pull strip of the cassette of FIG. 1 in different phases of the engagement between the pull strip and the film strip.

In the drawings, the improved multipurpose cassette of the present invention is generally designated by the reference numeral 10 as shown in FIG. 1, the cassette includes a generally parallelepiped casing or housing 12 defined by planar faces or side walls 14 and 16, end walls 18 and 20 and elongated top and bottom edge walls 22 and 24. A pair of reels respectively designated hereinafter as supply reel 26 and takeup reel 28 are supported for rotation in the housing by suitable complementing structure provided on the side walls 14 and 16. Each reel is provided with a drive socket 32 adapted for engagement by appropriate drive shafts in either the camera (not shown) or the viewing apparatus (not shown) with which the cassette is used in accordance with the overall system described in the references cited hereinabove. Each of the reels 26 and 28 is provided further with a pair of opposed flanges 34 and 36 fixed to opposite ends of central hubs 38 and 39, respectively, to which opposite ends of a film strip 40 are permanently connected. In FIG. 1, the film strip is shown in the position it would be in immediately following complete exposure or projection of the film strip, that is, with most of the film strip wound onto the takeup reel 28. Still referring to FIG. 1, it will be noted that the path of the film strip 40 in the housing 12 extends from its point of connection 42 at the hub 38 of the supply reel 26 about guide rollers 44 and 46, across a normally inoperative film processing station 48, past an opening 50 in the wall 24, about another guide roller 52 and from there to the takeup reel 28. The opening 50 functions at different times to facilitate both exposure and projection of the film strip 40, a prism 54 being located behind the film strip at the opening 50 to facilitate the latter operation.

FIG. 2 of the drawings illustrates the end 56 of the film strip 40 which is attached to the supply reel 26. This end of the film strip is referred to as the supply leader and is provided with an aperture 58 for permanent connection to the hub 38 of the supply reel 26. The major central portion of the film upon which projectable images may be formed (not shown) includes material carrying an emulsion or photosensitive coating of any conventional variety; for example, an emulsion developed by a monobath processing composition to form a positive transparency suitable for projection. A series of uniformly spaced sprocket holes 60 are provided along the length of the film as is conventional to facilitate incremental film advance during exposure and projection.

Referring still to FIG. 2, the supply leader 56 is provided with a discontinuity, preferably an aperture 62 of bottle-shaped configuration to provide an elongated major aperture portion 64 extending in the direction of the end of the supply leader 56. The aperture further includes a necked-down portion 66, and an undercut or transverse slot-like portion 68 hereinafter referred to as the locking portion of the aperture. The necked-down portion, or passageway 66, is defined by a pair of opposed inwardly extending tabs 70, each of which is provided with an inclined ramp-like edge 72 on the side communicating with the major aperture portion 64 and an abrupt edge portion 74 extending substantially perpendicular to the longitudinal dimension of the film strip, facing the locking portion 68. The aperture 62 is disposed a predetermined distance from the end of the supply leader which distance is less than the circumference of the supply reel hub 38.

Figure 5:
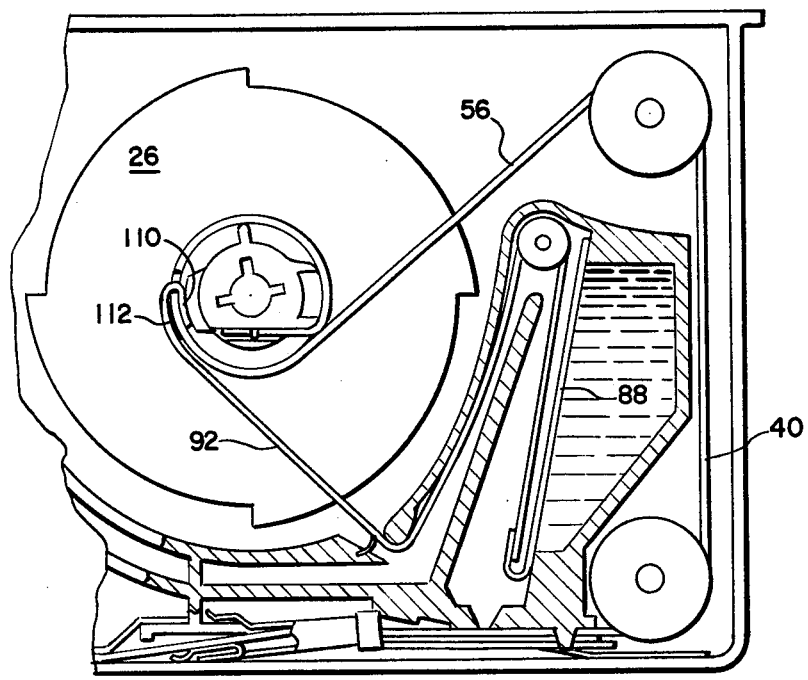

With reference again to FIG. 1 of the drawings, it will be noted that the processing station 48 is formed in part by internal cassette transverse wall formations 76 and 78 defining in part a pair of chambers 80 and 82, the latter of which opens at its bottom to a processing fluid applicator nozzle 84 positioned to overlie the emulsion carrying surface of the film strip 40 as it passes between the cassette exposure/projection opening 50 and the guide roller 46. The chamber 80 constitutes an initially sealed reservoir for processing fluid and opens along one upright side to the chamber 82 at a peripherally extending planar face 86 to which a releasable tear tab closure 88, as shown in FIGS. 1, 4 and 5 of the drawings, extends from the top of the chamber 80 downwardly over the planar face 86 to the bottom of the chamber near the nozzle 84 and is then folded or bent in a reverse direction at its lower end to establish an upwardly directed leading end portion 90 secured by bonding, fusion or other suitable means to one end of a pull strip extension 92. The attachment of the tear tab to the pull strip extension is in an overlapping fashion so that the pull strip 92 initially lies within the reverse bend of the tear tab. Such an arrangement facilitates separation of the pull strip from the tear tab closure after these components have served their processing function as will be described hereinbelow.

Pull strip 92 extends upwardly from the overlapping joint with the tear tab closure portion 90, about a guide roller 94 and from there downwardly through a channel 96 defined in part by the wall formation 78 and in part by another transverse wall formation 98. The wall 98 terminates at its lower end in a guiding formation which, in the present embodiment, comprises an enlarged radius defining section 100 which establishes one side of an exit opening 102 from the channel 96 and through which the pull strip 92 passes after a second reverse bend to thereby establish an initially substantially Z-shaped configuration in the pull strip. A sealing member 104 of flexible material may be provided across the exit opening to seal the latter following processing. The pull strip 92 is formed from any suitable resilient material such as mylar and is initially supported in passing about the roller 94 and the radius 100 so as to stress the pull strip within its elastic limit resulting in an inherent bias tending to restore the pull strip to its initially straight condition. Accordingly, referring to FIG. 1, the free end portion 106 of the pull strip 92 which projects from the exit 102 is urged yieldably against the outermost convolution of film strip wound on the supply spool 26. The pull strip 92 is of sufficient length so that the free end 106 thereof will remain in contact with the outermost convolution of the film strip and will be directed in the direction of film strip travel during exposure of the film following complete payout of all of the film initially contained upon the supply reel 26. FIG. 1 shows the supply reel 26, the film strip 40, and the pull strip 92 in their relative positions immediately following complete payout of the film from the supply reel.

As shown in FIG. 3 of the drawings, the free end portion 106 of the pull strip 92 includes a tapered latching tongue portion 110 which is connected to the pull strip 92 by a necked-down portion 111. The width of the necked-down portion 111 is greater than the width of the necked-down passageway 66 for the film strip defined by the tabs 70. The size and shape of the latching tongue 110 and the necked-down portion 111 are such that they will engage the bottle-shaped aperture 62 in the film strip 40 upon initial movement of the film strip 40 back onto the supply spool 26. Accordingly, it should be noted that the position of the bottle-shaped opening on the film strip leader is such that it will be at or past the free end of the pull strip 106 when the film strip has travelled fully from the supply spool 26 to the takeup spool 28, as illustrated in FIG. 1.

As best shown in FIG. 3, a strip of material 112 is carried upon the surface of the pull strip 92 at a location substantially immediately adjacent the necked-down portion 111. This strip of material 112 is made from a material having a coefficient of friction greater than the coefficient of friction of the material from which the pull strip is fabricated. The strip preferably comprises a rubberized material of some type which may be readily adhesively fastened to the surface of the pull strip. Other possible materials include the adhesive application of some form of grit or the like to form a sandpaper like surface, or application of a material having an embossed or textured-like surface.

The material extends preferably about one-half inch along the pull strip surface as measured from the necked-down portion 111 and extends the full width of the film strip. The mylar pull strips 92 are manufactured by stamping or punching them out of a larger sheet of mylar or similar material. Referring to FIG. 6, a portion 114 of such a sheet is shown and it will be seen that the high friction material may be applied in a continuous ribbon 116 at the appropriate location to such sheet prior to the punching out of the pull strips, there being the outline 118 of a portion of several pull strips shown on the fragment of the overall mylar sheet of this figure. Such an arrangement accordingly facilitates and simplifies the application and positioning of the high friction material on the pull strip.

Operation of the improved cassette of the present invention to effect exposure of the film strip 40 in a suitable camera is essentially the same as that disclosed in the aforementioned U.S. Pat. No. 3,785,725. Following exposure in the camera, the cassette 10 is placed in a projecting apparatus so as to be vertically oriented in the position illustrated in FIG. 1 of the drawing with the bottom wall 24 facing downwardly. At this time, the orientation of the film strip and the pull strip 92 are also substantially as shown in FIG. 1.

Referring now to FIGS. 1, 4 and 5, upon initiation of rewind of the film strip 40, the latching tongue 110 and the necked-down portion 111 will pass into the major aperture portion 64 of the film strip aperture 62 and upon continued advancement of the film strip, as best seen in FIG. 4, the latching tongue is caused to be folded substantially parallel to and in a direction counter to the direction of travel of the film strip and upon continued advancement of the film strip, the latching tongue of the pull strip will be pulled into locking engagement with the bottle-shaped aperture of the film strip. The details of such engagement are described, for example, in the prior referenced U.S. Pat. No. 3,895,862 as well as in U.S. Pat. No. 4,027,956 also assigned to the assignee of the present application.

With reference now to FIGS. 4 and 5, it will be seen in FIG. 4 that substantially immediately following engagement of the pull strip arrowhead portion 106 with the film strip 92 that the strip of high coefficient of friction material 112 carried by the pull strip will pass into confronting engagement with the surface of the outermost convolution of film strip passing onto the supply reel. FIG. 5 shows further advancement of the film strip and pull strip onto the supply reel and illustrates the device at the point where the resisting force of the tear tab closure 88 is about to be transmitted through the pull strip 92. Further at this time, the interface between the high friction material 112 and the outermost convolution of the film strip has passed to a point where they are positively engaged with one another and, it should be appreciated that as a result of the high coefficient of friction of the strip 112, such interface will serve to resist at least a portion of the force necessary to effect removal of the tear tab to actuate the processing station. As a result of such reaction of a portion of the resisting force, the full force necessary to remove the tear tab is not transmitted to the necked-down portion 111 of the free end of the pull strip where it is in locking engagement with the bottle-shaped aperture 62 in the film strip. Accordingly, the stresses on the necked-down portion of the pull strip are substantially and advantageously reduced, being transmitted to the outermost convolution of the film strip itself through the described frictional force resisting arrangement.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. In a film cassette comprising a housing, a rotatably mounted reel within the housing, an elongated strip of photographic film disposed along a predetermined path within said cassette and having one end thereof connected to said reel so that, responsive to the rotation of said reel, said film strip will be progressively coiled around and supported in said reel, said film strip having a tactile discontinuity adjacent its said one end, a processing station positioned within said housing and containing a quantity of processing fluid sufficient to coat substantially the entire length of said film strip, said processing station being actuatable upon withdrawal therefrom of an elongated pull strip responsive to a force sufficient to overcome a given resisting force, said pull strip having a free end formed and adapted such that, as said reel is rotated to progressively coil said film strip therearound, said pull strip will lockingly engage said tactile discontinuity to thereby draw said pull strip into said coiled film, the improvement comprising:

a strip of material carried upon the surface of said pull strip substantially immediately adjacent said free end thereof, such that said strip of material is brought into engagement with a portion of the outermost convolution of said film strip, following engagement of said pull strip and film strip, as said pull strip is drawn to said reel, said strip of material having a coefficient of friction greater than the coefficient of friction of the material from which said pull strip is fabricated whereby the frictional engagement of said strip of material with said film strip upon passage of said film strip and said pull strip onto said reel will serve to resist at least a portion of said given resisting force transmitted by said pull strip upon withdrawal of said pull strip to actuate said processing station and as a result the full force necessary to actuate said station is not transmitted to said free end of said pull strip which is locked in engagement with said film strip.

2. In a film cassette comprising a housing, a rotatably mounted reel within the housing, an elongated strip of photographic film disposed along a predetermined path within said cassette and having one end thereof connected to said reel so that, responsive to the rotation of said reel, said film strip will be progressively coiled around and supported on said reel, said film strip having a locking aperture adjacent its said one end, said cassette additionally comprising a processing station containing a quantity of processing fluid sufficient to coat substantially the entire length of said film strip and actuatable upon withdrawal of an elongated strip-like structure from said station responsive to a force sufficient to overcome a given resisting force, said strip-like structure having a free end formed and adapted such that it will enter said locking aperture of said film strip with an immediately adjacent portion thereof overlying said film strip as said reel is rotated to progressively coil said film strip therearound, the improvement comprising:

a strip of material carried upon the surface of said immediately adjacent portion of said free end of said strip-like structure such that said strip of material is brought into engagement with a portion of the outermost convolution of said film strip as said strip-like structure is drawn to said reel, said strip of material having a coefficient of friction with respect to said film strip greater than the coefficient of friction of the material from which said strip-like structure is fabricated whereby upon contact of said strip of material with said film strip and further upon passage of said film strip and said elongated strip of material onto said reel, the frictional engagement therebetween will serve to resist at least a portion of said given resisting force transmitted by said strip-like structure upon withdrawal of said strip-like structure to actuate said processing station and as a result the full force necessary to withdraw said elongated strip-like structure is not transmitted to said free end of said strip-like structure which is locked in engagement with said locking aperture of said film strip.

3. In a film cassette comprising a housing, a rotatably mounted reel within the housing presenting an annular surface, an elongated strip of photographic film disposed along a predetermined path within said cassette and having one end thereof connected to said reel so that, responsive to the rotation of said reel, said film strip will be progressively coiled around and supported on said reel's annular surface, said film strip having a locking aperture passing therethrough adjacent its said one end, said cassette additionally comprising a processing station containing a quantity of processing fluid sufficient to coat substantially the entire length of said film strip and actuatable responsive to a force sufficient to overcome a given resisting force to effect withdrawal of an elongated strip-like structure having a free end bearing against said film strip intermediate its said locking aperture and said reel prior to said film strip being coiled around said reel, said free end of said strip-like structure being formed and adapted such that it will enter said locking aperture of said film strip with an end portion thereof disposed between said annular surface of said reel and an adjacent section of said film strip in a folded back manner with respect to other portions of said strip-like structure as said reel is rotated to progressively coil said film strip therearound, the improvement comprising:

a strip of material carried upon the surface of said strip-like structure substantially immediately adjacent said end portion of said free end of said strip-like structure which has passed through said locking aperture and lies in a folded back manner, said strip of material coming into engagement with a portion of the outermost convolution of said film strip, said strip of material having a coefficient of friction with respect to said film strip greater than the coefficient of friction of the material from which said strip-like structure is fabricated whereby upon contact of said strip of material with said film strip and further upon passage of said film strip and said elongated strip of material onto said reel, the frictional engagement therebetween will serve to resist at least a portion of said given resisting force transmitted by said strip-like structure upon with drawal of said strip-like structure to actuate said processing station; as a result the full force necessary to withdraw said elongated strip-like structure is not transmitted to said free end of said strip-like structure which is locked in engagement with said locking aperture of said film strip.

4. The apparatus of either claim 1, 2 or 3 wherein said strip of material is fabricated from a rubberized material.

5. The apparatus of either claim 1, 2 or 3 wherein said strip of material is fabricated from a material presenting a roughened surface to said outermost convolution of film strip.

6. The apparatus of either claim 1, 2 or 3 wherein said strip of material comprises sand particles adhesively bonded to said pull strip.

* * * * *